(12) United States Patent
Fontoura et al.

(10) Patent No.: US 7,783,626 B2
(45) Date of Patent: Aug. 24, 2010

(54) PIPELINED ARCHITECTURE FOR GLOBAL ANALYSIS AND INDEX BUILDING

(75) Inventors: Marcus Felipe Fontoura, San Jose, CA (US); Reiner Kraft, Gilroy, CA (US); Tony Kai-Chi Leung, San Jose, CA (US); John A. McPherson, Jr., San Jose, CA (US); Andreas Neumann, Gilroy, CA (US); Runping Qi, Cupertino, CA (US); Sridhar Rajagopalan, Oakland, CA (US); Eugene J. Shekita, San Jose, CA (US); Jason Yeong Zien, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 410 days.

(21) Appl. No.: 11/840,881

(22) Filed: Aug. 17, 2007

(65) Prior Publication Data

US 2007/0282829 A1     Dec. 6, 2007

Related U.S. Application Data

(63) Continuation of application No. 10/764,772, filed on Jan. 26, 2004, now Pat. No. 7,293,005.

(51) Int. Cl.
  *G06F 7/00* (2006.01)
(52) U.S. Cl. .......................... 707/716; 707/741
(58) Field of Classification Search ............... 707/1–10, 707/100, 713–723, 726–728, 741–754
See application file for complete search history.

(56) References Cited

U.S. PATENT DOCUMENTS

| | | | |
|---|---|---|---|
| 4,965,763 A | 10/1990 | Zamora | |
| 5,187,790 A | 2/1993 | East et al. | |
| 5,265,221 A | 11/1993 | Miller | |
| 5,287,496 A | 2/1994 | Chen et al. | |
| 5,297,039 A | 3/1994 | Kanaegami et al. | |
| 5,423,032 A | 6/1995 | Byrd et al. | |
| 5,574,906 A | 11/1996 | Morris | |

(Continued)

FOREIGN PATENT DOCUMENTS

EP     0809197     11/1997

(Continued)

OTHER PUBLICATIONS

Patent Abstract for JP10289246, published Oct. 27, 1998, 1 pg.

(Continued)

*Primary Examiner*—Wilson Lee
(74) *Attorney, Agent, or Firm*—Janaki K. Davda; Konrad Raynes & Victor LLP

(57) ABSTRACT

Provided is a technique for building an index. A new $index_{i+1}$ is built and an anchor text $table_{i+1}$ and a duplicates $table_{i+1}$ are output using a $store_i$, a delta store, and previously generated global analysis $computations_i$, wherein the previously generated global analysis $computations_i$ include an anchor text $table_i$, a rank $table_i$, and a duplicates $table_i$. New global analysis $computations_{i+1}$ are generated using the anchor text tablei+1, the duplicates $table_{i+1}$, and the previously generated global analysis $computations_i$.

21 Claims, 14 Drawing Sheets

U.S. PATENT DOCUMENTS

| | | | |
|---|---|---|---|
| 5,638,543 A | 6/1997 | Pederson et al. |
| 5,685,003 A | 11/1997 | Peltonen et al. |
| 5,701,469 A | 12/1997 | Brandli et al. |
| 5,708,825 A | 1/1998 | Sotomayor |
| 5,721,938 A | 2/1998 | Stuckey |
| 5,721,939 A | 2/1998 | Kaplan |
| 5,724,033 A | 3/1998 | Burrows |
| 5,729,730 A | 3/1998 | Wlaschin et al. |
| 5,745,889 A | 4/1998 | Burrows |
| 5,745,890 A | 4/1998 | Burrows |
| 5,745,894 A | 4/1998 | Burrows et al. |
| 5,745,898 A | 4/1998 | Burrows |
| 5,745,899 A | 4/1998 | Burrows |
| 5,745,900 A | 4/1998 | Burrows |
| 5,745,904 A | 4/1998 | King et al. |
| 5,745,906 A | 4/1998 | Squibb |
| 5,756,150 A | 5/1998 | Mori et al. |
| 5,765,149 A | 6/1998 | Burrows |
| 5,765,158 A | 6/1998 | Burrows |
| 5,765,168 A | 6/1998 | Burrows |
| 5,787,435 A | 7/1998 | Burrows |
| 5,797,008 A | 8/1998 | Burrows |
| 5,809,502 A | 9/1998 | Burrows |
| 5,832,480 A | 11/1998 | Byrd, Jr. et al. |
| 5,832,500 A | 11/1998 | Burrows |
| 5,832,519 A | 11/1998 | Bowen et al. |
| 5,852,820 A | 12/1998 | Burrows |
| 5,862,325 A | 1/1999 | Reed et al. |
| 5,864,863 A | 1/1999 | Burrows |
| 5,873,097 A | 2/1999 | Harris et al. |
| 5,884,305 A | 3/1999 | Kleinberg et al. |
| 5,890,103 A | 3/1999 | Carus |
| 5,893,119 A | 4/1999 | Squibb |
| 5,903,646 A | 5/1999 | Rackman |
| 5,903,891 A | 5/1999 | Chen et al. |
| 5,903,901 A | 5/1999 | Kawakura et al. |
| 5,909,677 A | 6/1999 | Broder et al. |
| 5,914,679 A | 6/1999 | Burrows |
| 5,915,251 A | 6/1999 | Burrows et al. |
| 5,920,859 A | 7/1999 | Li |
| 5,924,091 A | 7/1999 | Burkhard |
| 5,933,822 A | 8/1999 | Braden-Harder et al. |
| 5,963,940 A | 10/1999 | Liddy et al. |
| 5,963,954 A | 10/1999 | Burrows |
| 5,966,703 A | 10/1999 | Burrows |
| 5,966,710 A | 10/1999 | Burrows |
| 5,970,497 A | 10/1999 | Burrows |
| 5,974,412 A | 10/1999 | Hazlehurst et al. |
| 5,995,980 A | 11/1999 | Olson et al. |
| 6,005,503 A | 12/1999 | Burrows |
| 6,016,493 A | 1/2000 | Burrows |
| 6,016,501 A | 1/2000 | Martin et al. |
| 6,021,409 A | 2/2000 | Burrows |
| 6,026,388 A | 2/2000 | Liddy et al. |
| 6,026,413 A | 2/2000 | Challenger et al. |
| 6,029,165 A | 2/2000 | Gable |
| 6,035,268 A | 3/2000 | Carus et al. |
| 6,047,286 A | 4/2000 | Burrows |
| 6,067,543 A | 5/2000 | Burrows |
| 6,078,914 A | 6/2000 | Redfern |
| 6,078,916 A | 6/2000 | Culliss |
| 6,078,923 A | 6/2000 | Burrows |
| 6,088,694 A | 7/2000 | Burns et al. |
| 6,105,019 A | 8/2000 | Burrows |
| 6,119,124 A | 9/2000 | Broder et al. |
| 6,182,062 B1 | 1/2001 | Fujisawa et al. |
| 6,182,121 B1 | 1/2001 | Wlaschin |
| 6,192,258 B1 | 2/2001 | Kamada et al. |
| 6,192,333 B1 | 2/2001 | Pentheroudakis |
| 6,205,451 B1 | 3/2001 | Norcott et al. |
| 6,205,456 B1 | 3/2001 | Nakao |
| 6,216,175 B1 | 4/2001 | Sliger et al. |
| 6,233,571 B1 | 5/2001 | Egger et al. |
| 6,243,713 B1 | 6/2001 | Nelson et al. |
| 6,243,718 B1 | 6/2001 | Klein et al. |
| 6,269,361 B1 | 7/2001 | Davis et al. |
| 6,278,992 B1 | 8/2001 | Curtis et al. |
| 6,285,999 B1 | 9/2001 | Page |
| 6,295,529 B1 | 9/2001 | Corston-Oliver et al. |
| 6,308,179 B1 | 10/2001 | Petersen et al. |
| 6,324,566 B1 | 11/2001 | Himmel et al. |
| 6,336,117 B1 | 1/2002 | Massarani |
| 6,339,772 B1 | 1/2002 | Klein et al. |
| 6,374,268 B1 | 4/2002 | Testardi |
| 6,381,602 B1 | 4/2002 | Shoroff et al. |
| 6,385,616 B1 | 5/2002 | Gardner |
| 6,418,433 B1 | 7/2002 | Chakrabarti et al. |
| 6,421,655 B1 | 7/2002 | Horvitz et al. |
| 6,463,439 B1 | 10/2002 | Dahlberg |
| 6,507,846 B1 | 1/2003 | Consens |
| 6,519,592 B1 | 2/2003 | Getchius et al. |
| 6,519,593 B1 | 2/2003 | Matias et al. |
| 6,519,597 B1 | 2/2003 | Cheng et al. |
| 6,529,285 B1 | 3/2003 | Bobrow et al. |
| 6,542,906 B2 | 4/2003 | Korn |
| 6,547,829 B1 | 4/2003 | Meyerzon et al. |
| 6,553,385 B2 | 4/2003 | Johnson et al. |
| 6,567,804 B1 | 5/2003 | Ramasamy et al. |
| 6,578,032 B1 | 6/2003 | Chandrasekar et al. |
| 6,584,458 B1 | 6/2003 | Millett et al. |
| 6,594,682 B2 | 7/2003 | Peterson et al. |
| 6,615,209 B1 | 9/2003 | Gomes et al. |
| 6,618,725 B1 | 9/2003 | Fukuda et al. |
| 6,622,211 B2 | 9/2003 | Henry et al. |
| 6,631,369 B1 | 10/2003 | Meyerzon et al. |
| 6,631,496 B1 | 10/2003 | Li et al. |
| 6,633,872 B2 | 10/2003 | Ambrosini et al. |
| 6,643,650 B1 | 11/2003 | Slaughter et al. |
| 6,658,406 B1 | 12/2003 | Mazner et al. |
| 6,658,423 B1 | 12/2003 | Pugh et al. |
| 6,665,657 B1 | 12/2003 | Dibachi |
| 6,678,409 B1 | 1/2004 | Wu et al. |
| 6,725,214 B2 | 4/2004 | Garcia-Chiesa |
| 6,754,873 B1 | 6/2004 | Law et al. |
| 6,763,362 B2 | 7/2004 | McKeeth |
| 6,766,316 B2 | 7/2004 | Caudill et al. |
| 6,789,077 B1 | 9/2004 | Slaughter et al. |
| 6,810,375 B1 | 10/2004 | Ejerhed |
| 6,829,606 B2 | 12/2004 | Ripley |
| 6,839,665 B1 | 1/2005 | Meyers |
| 6,839,702 B1 | 1/2005 | Patel et al. |
| 6,839,843 B1 | 1/2005 | Bacha et al. |
| 6,842,730 B1 | 1/2005 | Ejerhed et al. |
| 6,845,009 B1 | 1/2005 | Whitted |
| 6,850,979 B1 | 2/2005 | Saulpaugh et al. |
| 6,865,575 B1 | 3/2005 | Smith et al. |
| 6,868,447 B1 | 3/2005 | Slaughter et al. |
| 6,870,095 B1 | 3/2005 | Whitted |
| 6,877,136 B2 | 4/2005 | Bess et al. |
| 6,904,454 B2 | 6/2005 | Stickler |
| 6,906,920 B1 | 6/2005 | Whitted |
| 6,907,423 B2 | 6/2005 | Weil et al. |
| 6,934,634 B1 | 8/2005 | Ge |
| 6,985,948 B2 | 1/2006 | Taguchi et al. |
| 6,990,634 B2 | 1/2006 | Conroy et al. |
| 6,999,971 B2 | 2/2006 | Latarche et al. |
| 7,024,623 B2 | 4/2006 | Higashiyama et al. |
| 7,031,954 B1 | 4/2006 | Kirsch |
| 7,051,023 B2 | 5/2006 | Kapur et al. |
| 7,065,784 B2 | 6/2006 | Hopmann et al. |
| 7,080,091 B2 | 7/2006 | Matsuda |
| 7,089,532 B2 | 8/2006 | Rubin |
| 7,096,208 B2 | 8/2006 | Zaragoza et al. |
| 7,136,806 B2 | 11/2006 | Miyahira et al. |

| | | |
|---|---|---|
| 7,139,752 B2 | 11/2006 | Broder et al. |
| 7,146,361 B2 | 12/2006 | Broder et al. |
| 7,173,912 B2 | 2/2007 | Jaber et al. |
| 7,197,497 B2 | 3/2007 | Cossock |
| 7,243,301 B2 | 7/2007 | Bargeron et al. |
| 7,257,593 B2 | 8/2007 | Mazner et al. |
| 7,318,075 B2 | 1/2008 | Ashwin et al. |
| 7,356,530 B2 | 4/2008 | Kim et al. |
| 7,362,323 B2 | 4/2008 | Doyle |
| 7,424,467 B2 | 9/2008 | Fontoura et al. |
| 7,461,064 B2 | 12/2008 | Fontoura et al |
| 7,499,913 B2 | 3/2009 | Kraft et al. |
| 2001/0049671 A1 | 12/2001 | Joerg |
| 2002/0032677 A1 | 3/2002 | Morgenthaler et al. |
| 2002/0120685 A1 | 8/2002 | Srivastava et al. |
| 2002/0165707 A1 | 11/2002 | Call |
| 2002/0169770 A1 | 11/2002 | Kim et al. |
| 2003/0028564 A1 | 2/2003 | Sanfilippo |
| 2003/0046311 A1 | 3/2003 | Baidya et al. |
| 2003/0163454 A1 | 8/2003 | Jacobsen et al. |
| 2003/0177127 A1 | 9/2003 | Goodwin et al. |
| 2003/0187833 A1 | 10/2003 | Plu |
| 2003/0217052 A1 | 11/2003 | Rubenczyk et al. |
| 2003/0225763 A1 | 12/2003 | Guilak et al. |
| 2004/0044962 A1* | 3/2004 | Green et al. ............... 715/513 |
| 2004/0078387 A1 | 4/2004 | Benjamin et al. |
| 2004/0098399 A1* | 5/2004 | Risberg et al. ............. 707/100 |
| 2004/0111408 A1 | 6/2004 | Caudill et al. |
| 2004/0123104 A1 | 6/2004 | Boyen et al. |
| 2004/0243554 A1 | 12/2004 | Broder et al. |
| 2004/0243556 A1 | 12/2004 | Ferrucci et al. |
| 2004/0243560 A1 | 12/2004 | Broder et al. |
| 2004/0243581 A1 | 12/2004 | Weissman et al. |
| 2005/0033745 A1* | 2/2005 | Wiener et al. ................ 707/10 |
| 2005/0044411 A1 | 2/2005 | Somin et al. |
| 2005/0120004 A1 | 6/2005 | Stata et al. |
| 2005/0149499 A1 | 7/2005 | Franz et al. |
| 2005/0149576 A1 | 7/2005 | Marmaros et al. |
| 2005/0149851 A1 | 7/2005 | Mittal |
| 2005/0165800 A1 | 7/2005 | Fontoura et al. |
| 2005/0198076 A1 | 9/2005 | Stata et al. |
| 2006/0047825 A1 | 3/2006 | Steenstra et al. |
| 2006/0129538 A1 | 6/2006 | Baader et al. |
| 2007/0016583 A1 | 1/2007 | Lempel et al. |
| 2007/0198456 A1 | 8/2007 | Betz et al. |
| 2007/0271268 A1 | 11/2007 | Fontoura et al. |
| 2008/0294634 A1 | 11/2008 | Fontoura et al. |
| 2008/0301130 A1 | 12/2008 | Fontoura et al. |
| 2009/0083270 A1 | 3/2009 | Kraft et al. |

FOREIGN PATENT DOCUMENTS

| | | |
|---|---|---|
| WO | 9749048 | 12/1997 |

OTHER PUBLICATIONS

Patent Abstract for JP10293767, published Nov. 4, 1998, 1 pg.
Patent Abstract for JP2000339309, published Dec. 8, 2000, 1 pg.
Kaushik, R., R. Krishnamurthy, J.F. Naughton and R. Ramakrishnan, "On the Integration of Structure Indexes and Inverted Lists," Proceedings of the 20th International Conference on Data Engineering, 2004, 1 p.
Press, W.H., B.P. Flannery, S.A. Teukolsky and W.T. Vetterling, "Numerical Recipes in C: The Art of Scientific Computing", 1998, Ch. 9, 8 pp.
Lu, W, L. Chien, & H. Lee, "Anchor Text Mining for Translation of Web Queries", Proceedings of First IEEE International Conference on Data Mining, Nov. 2001, 8 pp.
PCT International Search Report and Written Opinion, May 6, 2005, for International Application No. PCT/EP2005/050321, 11 pp.
PCT International Search Report and Written Opinion, Oct. 30, 2006, for International Application No. PCT/EP2006/064281, 11 pp.
Baeza-Yates, R. and B. Ribeiro-Neto, "Modern Information Retrieval", England: Pearson Education Limited 1999, Ch. 8 & Ch. 13, 29 pp.
Corme, T.H., C.E. Leiserso, R.L. Rives, and C. Stei, "Introduction to Algorithms", Cambridge: The MIT Press, Second Edition, 2003, Chapter 8, 22 pp.
Dieberger, A. and D.M. Russell, "Context Lenses—Document Visualization and Navigation Tools for Rapid Access to Detail", Human-Computer Interaction INTERACT '01, Jul. 2003, 10 pp.
Hardman, L. "Links in Hypermedia: the Requirement for Context", Proceedings of the 5th ACM Conference on Hypertext, Nov. 1993, 9 pp.
Kaindl. H., S. Kramer, and L.M. Afonso, "Combining Structure Search and Content Search for the World-Wide Web," Proceedings of the 9th ACM Conference on Hypertext and Hypermedia, 1998, 8 pp.
Macurious Software Foundation, "Macurious Spider Frequently Asked Questions 3.0", [online] [retrieved on Oct. 8, 2003], retrieved from the Internet at <URL: http://www.macurious.com/spider/faq.htm>, 10 pp.
Miscellaneous Articles from Newsgroups, Available from: (1) Newsgroups:google.public.support.general; Date: Jul. 5, 2002 and Jul. 6, 2002; (2) Newsgroups: comp.protocols.tcp-ip.domains; Date Apr. 8, 2000; (3) Newsgroups: micorsoft.public.frontpage.client; Date: Mar. 18, 1999 [3 entries] and Mar. 19, 1999 and (4) Newsgroups:alt.internet.search-engines; Date: Jan. 26, 2002, 3 pp.
Sedgewick, R., "Algorithms in C++. Parts 1-4." Boston: Addison-Wesley Publishing Co., 1998, Chapter 10, 39 pp.
Weinreich, H., H. Obendorf, and W. Lamersdorf, "The Look of the Link—Concepts for the User Interface of Extended Hyperlinks", Proceedings of the 12th ACM Conference on Hypertext and Hypermedia, 2001, 10 pp.
Witten, I.H., A. Moffat, and T.C. Bell, "Managing Gigabytes: Compressing and Indexing Documents and Images", San Francisco: Morgan Kaufmann Publishers, 1999, Chapter 5, 48 pp.
Lee, J., S.J. Upadhyaya, H.R. Rao, and R. Sharman, "Secure Knowledge Management and the Semantic Web", Communications of the ACM, vol. 48, No. 12, Dec. 2005, 7 pp.
Agrawal, S., S Chaudhuri and G. Das, "DBXplorer: A System for Keyword-Based Search over Relational Databases," Proceedings of 18th International Conference on Data Engineering, 2002, 12 pp.
Agrawal, S., S Chaudhuri and G. Das, "DBXplorer: Enabling Keyword Search over Relational Databases", Proceedings of the 2002 ACM SIGMOD International Conference on Management of Data, 2002, 1 p.
Bhalotia, G., A. Hulgeri, C Nakhe, S. Chakrabarti and S. Sudarshan, "Keyword Searching and Browsing in Databases Using BANKS", Proceedings of the 18th International Conference on Data Engineering, 2002, 10 pp.
Brin, S. And L. Page, "The Anatomy of a Large-Scale Hypertextual Web Search Engine", Computer Networks and ISDN Systems, vol. 30, No. 1-7, 1998, 20 pp.
Broder, A.Z., D. Carmel, M. Herscovichi, A. Soffer and J. Zien, "Efficient Query Evaluation Using a Two-Level Retrieval Process", Twelfth International Conference on Information Knowledge Management (CIKM 2003), 2003, 9 pp.
Broder, A.Z., S.C. Glassman, M.S. Manasse, and G. Zweig, "Syntactic Clustering of the Web", [online], [Retrieved on Jul. 21, 2005]. Retrieved from the Internet at <URL:http://www.ra.ethz.ch/CDstore/www6/Technical/Paper205/Paper205.html>, 13 pp.
Bruno, N., K. Koudas and D. Srivastava, "Holistic Twig Joins: Optimal XML Pattern Matching", Proceedings of the 2002 ACM SIGMOD International Conference on Management of Data, 2002, 12 pp.
Carmel, D., Y. Maarek, M. Mandelbrod, Y. Mass and A. Soffer, "Searching XML Documents via XML Fragments," Proceedings of the 26th Annual International ACM SIGIR Conference on Research and Development in Information Retrieval, 2003, 8 pp.
Fontoura, M., E. Shekita, J. Zien, S. Rajagopalan and A. Neumann, "High Performance Index Build Algorithms for Intranet Search Engines", Proceedings of 30th International Conference on Very Large Data Bases, 2004, 13 pp.

French, G., "Hacking the Google Numrange Operator", [online], Apr. 1, 2004, [retrieved on Aug. 31, 2004], retrieved from the Internet at <URL: http://www.webpronews.com/insiderreports/searchinsider/wpn-49-20040401HackingtheGoogleNumrangeOperator.html>, 2 pp.

Google, "Advanced Search", [online], 2003, [retrieved on Aug. 31, 2004], retrieved from the Internet at <URL: http://www.google.com/help/refinesearch.html>, 3 pp.

Gravano, L., P.G. Ipeirotis, N. Koudas and D. Srivastava, "Text Joins in an RDBMS for Web Data Integration", Proceedings of the 12th International Conference on World Wide Web, 2003, 12 pp.

Guttman, A., "R-Trees: A Dynamic Index Structure for Spatial Searching", Proceedings of the 1984 ACM SIGMOD International Conference on Management of Data, 1984, 11 pp.

Hristidis, V. And Y. Papakonstantinou, "DISCOVER: Keyword Search in Relational Databases", Proceedings of the 28th VLDB Conference, 2002, 12 pp.

Melnik, S., S. Raghavan, B. Yang and H. Garcia-Molina, "Building a Distributed Full-Text Index for the Web,"ACM Transactions on Information Systems, vol. 19, No. 3, Jul. 2001, 25 pp.

Raghavan, S. and H. Garcia-Molina, "Complex Queries over Web Repositories", Proceedings of the 29th VLDB Conference, 2003, 12 pp.

Raghavan, S. And H. Garcia-Molina, "Integrating Diverse Information Management Systems: A Brief Survey", IEEE Data Engineering Bulletin, 2001, vol. 24, No. 4, 9 pp.

Ramsak, F., V. Markl, R. Fenk, M. Zirkel, K. Elhardt and R. Bayer, "Integrating the UB-Tree into a Database System Kernel", Proceedings of 26th International Conference on Very Large Data Bases, Sep. 2000, 10 pp.

Spertus, E. And L.A. Stein, "Squeal: A Structured Query Language for the Web", Proceedings of the 9th International World Wide Web Conference on Computer Networks, 2000, [online], [Retrieved on Sep. 4, 2002]. Retrieved from the Internet at <URL:http://www9.org/w9cdrom/222/222.html>, 12 pp.

Zobel, J., S. Heinz, and H.E. Williams, "In-Memory Hash Tables for Accumulating Text Vocabularies", Information Processing Letters, vol. 80, Iss. 6, 2001, 9 pp.

Lomet, D. (Ed.), "Bulleting of the Technical Committee on Data Engineering", Dec. 2001, vol. 24, No. 4, 56 pp.

Lu, Z., "Scalable Distributed Architectures for Information Retrieval", Dissertation, May 1999, Department of Computer Science, University of Massachusetts Amherst, 194 pp.

Tomasic, A., H. Garcia-Molina, and K. Shoens, "Incremental Updates of Inverted Lists for Text Document Retrieval", Nov. 18, 1993, Department of Computer Science, Stanford University, 43 pp.

EP Office Action, Dec. 28, 2007, for European Application No. 05 701 609.9-2201, 6 pp.

Agarwal, R.C. "A Super Scalar Sort Algorithm for RISC Processors", Proceedings of the 1996 ACM SIGMOD International Conference on Management of Data, 1996, 7 pp.

Arpaci-Dusseau, A.C., R.H. Arpaci-Dusseau, D.E. Culler, J.M. Hellerstein, and D.A. Patterson, "High Performance Sorting on Networks of Workstations", Proceedings of the 1996 ACM SIGMOD International Conference on Management of Data, 1997, 12 pp.

Brown, E., 'Execution Performance Issues in Full-Text Information Retrieval', Technical Report 95-81, Oct. 1995, 197 pp.

Brown, E., J.P. Callan, and W.B. Croft, "Fast Incremental Indexing for Full-Text Information Retrieval", Proceedings of the 20th International Conference on Very Large Data Bases, 1994, 11 pp.

Callan, J.P., W.B. Croft, and S.M. Harding:Mg, "The INQUERY Retrieval System", Proceedings of the 3rd International Conference on Database and Expert Systems Applications, 1992, 9 pp.

Clarke, C.L.A., G.V. Cormack, and F.J. Burkowski, "Shortest Substring Ranking (MultiText Experiments for Trec-4)", Proceedings of the Fourth Text Retrieval Conference, Nov. 1995, 10 pp.

Lim, L., M. Wang, S. Padmanabhan, J.S. Vitter, and R. Agarwal, "Dynamic Maintenance of Web Indexes Using Landmarks", Proceedings of the 12th International Conference on World Wide Web, 2003, 10 pp.

Long, X and T. Suel. "Optimized Query Execution in Large Search Engines with Global Page Ordering", Proceedings of the 29th VLDB Conference, 2003, 12 pp.

Pearson, P.K., "Fast Hashing of Variable Length Text Strings", Communications of the ACM, Jun. 1990, vol. 33, No. 6, 4 pp.

Tomasic, A. and H. Garcia-Molina, "Performance of Inverted Indices in Shared-Nothing Distributed Text Document Information Retrieval Systems", Proceedings of the Second International Conference on Parallel and Distributed Information Systems, IEEE 1993, Department of Computer Science, Stanford University, 11 pp.

Office Action 1 & Translation, Jul. 31, 2009, for Application No. CN2006800253422, 8 pp.

Office Action 1, Jun. 16, 2009, for EP Application No. EP06777790.4-1245, 3 pp.

* cited by examiner

Duplicates table 670

Anchor text table 672

Rank table 674

FIG. 6C

PIPELINED ARCHITECTURE FOR GLOBAL ANALYSIS AND INDEX BUILDING

CROSS-REFERENCE TO RELATED APPLICATION

This application is a continuation of and claims the benefit of U.S. Pat. No. 7,293,005, having application Ser. No. 10/764,772, filed on Jan. 26, 2004, the disclosure of which is incorporated herein by reference in its entirety.

BACKGROUND OF THE INVENTION

1. Field of the Invention

The present invention is related to a pipelined architecture for Global analysis and index building.

2. Description of the Related Art

The World Wide Web (also known as WWW or the "Web") is a collection of some Internet servers that support Web pages that may include links to other Web pages. A Uniform Resource Locator (URL) indicates a location of a Web page. Also, each Web page may contain, for example, text, graphics, audio, and/or video content. For example, a first Web page may contain a link to a second Web page. When the link is selected in the first Web page, the second Web page is typically displayed.

A Web browser is a software application that is used to locate and display Web pages. Currently, there are billions of Web pages on the Web.

Web search engines are used to retrieve Web pages on the Web based on some criteria (e.g., entered via the Web browser). That is, Web search engines are designed to return relevant Web pages given a keyword query. For example, the query "HR" issued against a company intranet search engine is expected to return relevant pages in the intranet that are related to Human Resources (HR). The Web search engine uses indexing techniques that relate search terms (e.g., keywords) to Web pages.

Global analysis computations may be described as extracting properties from a global view of documents in a corpus (e.g., documents available on the Web). One example of a global analysis computation is the page rank computation. A page rank computation takes as input a directed graph in which every document in the corpus is a node and every hyperlink between documents is an edge. Then, the page rank computation produces as output a global rank for each document in the corpus. Other examples of global analysis computations are duplicate detection (i.e., the identification of pages with similar or the same content) and template detection (i.e., identification of which parts of a Web page are part of a site template).

Search engines that use global analysis computations typically need to have the output of these computations ready before indexing the corpus. For instance, rank values computed by page rank may be used to determine the order of documents in the index, and the results of the duplicate detection computation may be used to filter out which documents should not be indexed. Having to perform all global analysis computations before the creation of the search indices is a problem in scenarios where freshness requirements impose constraints on the time allowed for index creation. In general, global computations are costly, since their computational time is proportional to the number of documents in the corpus, which in the case of the Web or some textual and biological databases is very large.

Additionally, conventional index structures designed for large scale search engines are not well tuned for incremental updates. Thus, incrementally updating an index is expensive in conventional systems.

Thus, there is a need for improved global analysis and index building.

SUMMARY OF THE INVENTION

Provided are a method, system, and program for building an index in which global analysis computations and index creation are pipelined, wherein the global analysis computations share intermediate results.

Also provided are a method, system, and program in which a new $index_{i+1}$ is built and an anchor text $table_{i+1}$ and a duplicates $table_{i+1}$ are output using a $store_i$, a delta store, and previously generated global analysis $computations_i$, wherein the previously generated global analysis $computations_i$ include an anchor text $table_i$, a rank $table_i$, and a duplicates $table_i$. New global analysis $computations_{i+1}$ are generated using the anchor text $table_{i+1}$, the duplicates $table_{i+1}$, and the previously generated global analysis $computations_i$.

BRIEF DESCRIPTION OF THE DRAWINGS

Referring now to the drawings in which like reference numbers represent corresponding parts throughout:

FIG. 6C illustrates auxiliary data structures that may be used by global analysis computations in accordance with certain implementations of the invention.

DETAILED DESCRIPTION

In the following description, reference is made to the accompanying drawings which form a part hereof and which illustrate several implementations of the present invention. It is understood that other implementations may be utilized and structural and operational changes may be made without departing from the scope of the present invention.

Implementations of the invention provide an architecture in which global analysis computations are pipelined so that intermediate results may be shared between different sets of global analysis computations and where lagging global analysis information is used for creating search indices. The term "lagging" may be described as performing processing with results of recent processing of documents existing at a certain point in time, but not necessarily processing that has taken into account documents existing at a current point in time.

Figure 1:
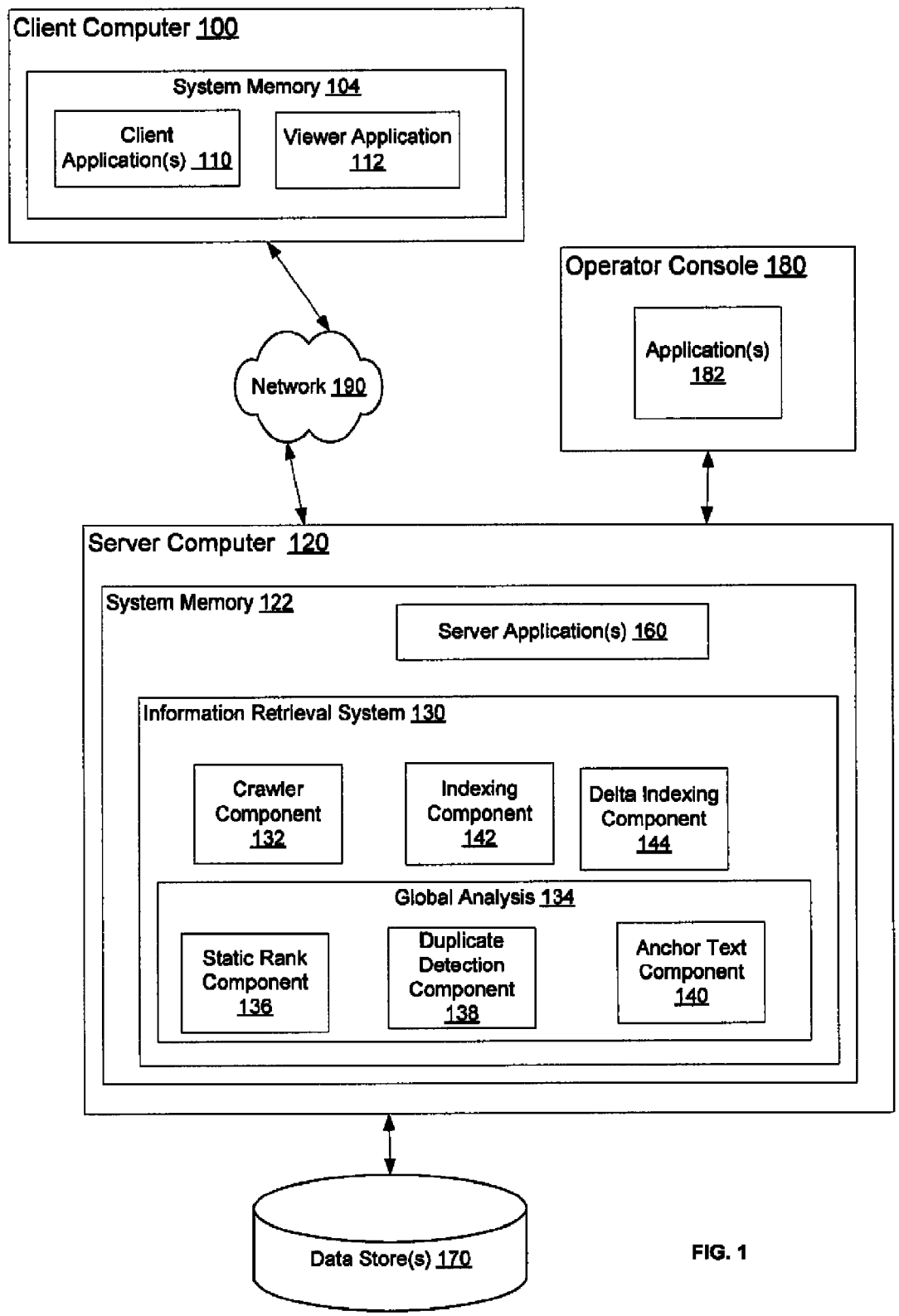
FIG. 1 illustrates, in a block diagram, a computing environment in accordance with certain implementations of the invention.

FIG. 1 illustrates, in a block diagram, a computing environment in accordance with certain implementations of the invention. A client computer 100 is connected via a network 190 to a server computer 120. The client computer 100 may comprise any computing device known in the art, such as a server, mainframe, workstation, personal computer, hand held computer, laptop telephony device, network appliance, etc. The network 190 may comprise any type of network, such as, for example, a Storage Area Network (SAN), a Local Area Network (LAN), Wide Area Network (WAN), the Internet, an Intranet, etc. The client computer 100 includes system memory 104, which may be implemented in volatile and/or non-volatile devices. One or more client applications 110 and a viewer application 112 may execute in the system memory 104. The viewer application 112 provides an interface that enables searching of a set of documents (e.g., stored in one or more data stores 170. In certain implementations, the viewer application 112 is a Web browser.

The server computer 120 includes system memory 122, which may be implemented in volatile and/or non-volatile devices. A information retrieval system 130 executes in the system memory 122. In certain implementations, the search engine includes a crawler component 132, a global analysis component 134, an indexing component 142, and a delta indexing component 144. The global analysis component 134 includes a static rank component 136, a duplicate detection component 138, an anchor text component 140. Although components 132, 136, 134, 138, 140, 142, and 144 are illustrated as separate components, the functionality of components 132, 136, 134, 138, 140, 142, and 144 may be implemented in fewer or more or different components than illustrated. Additionally, the functionality of the components 132, 136, 134, 138, 140, 142, and 144 may be implemented at a Web application server computer or other server computer that is connected to the server computer 120. Additionally, one or more server applications 160 execute in system memory 122.

The server computer 120 provides the client computer 100 with access to data in at least one data store 170 (e.g., a database). Although a single data store 170 is illustrated, for ease of understanding, data in data store 170 may be stored in data stores at other computers connected to server computer 120.

Also, an operator console 180 executes one or more applications 182 and is used to access the server computer 120 and the data store 170.

The data store 170 may comprise an array of storage devices, such as Direct Access Storage Devices (DASDs), Just a Bunch of Disks (JBOD), Redundant Array of Independent Disks (RAID), virtualization device, etc. The data store 170 includes data that is used with certain implementations of the invention.

In certain implementations of the invention, global analysis computations are performed by the global analysis component 134 in a pipelined manner with the use of lagging information and delta indices for an index build process performed by the indexing component 142. The global analysis computations described herein provide examples of possible global analysis computations, but such examples are not intended to limit the scope of the invention. The techniques of the invention are applicable to any global analysis computations.

Figure 2:
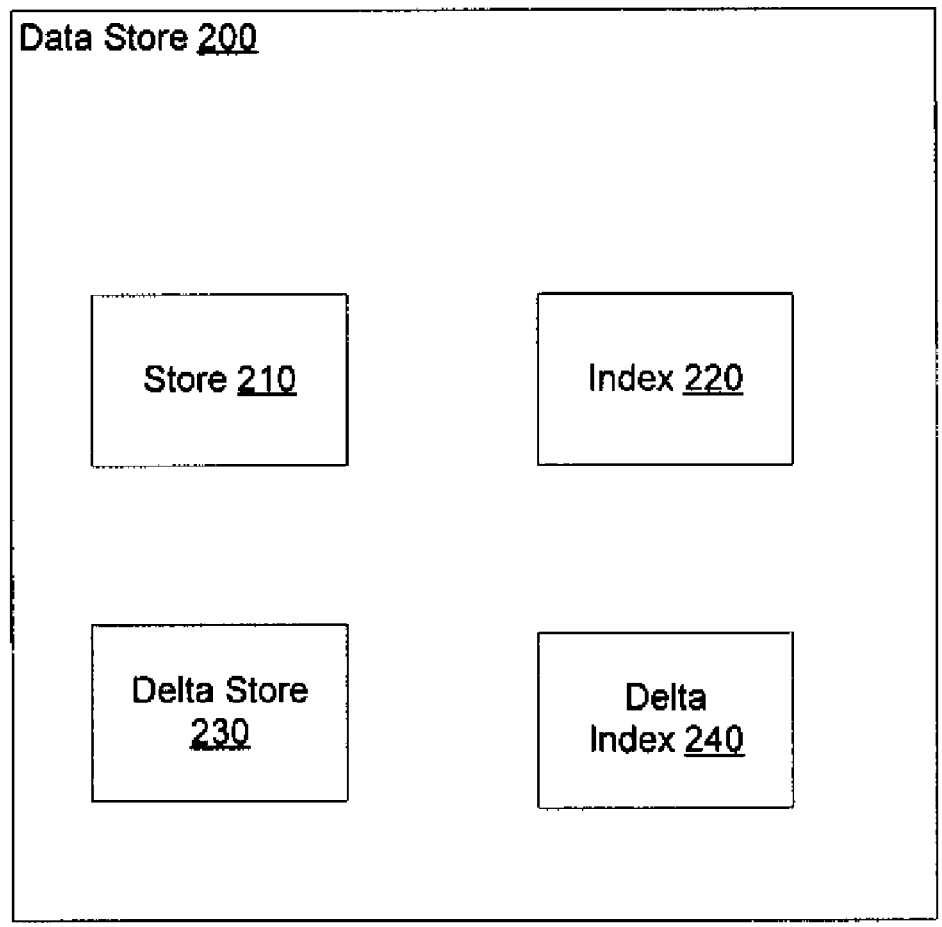
FIG. 2 illustrates a data store and data structures in accordance with certain implementations of the invention.

FIG. 2 illustrates a data store and data structures in accordance with certain implementations of the invention. Data store 200 may be one of data stores 170 (FIG. 1). Data store 200 includes a store 210, an index 220, a delta store 230, and a delta index 240. The store 210, index 224, delta store 230, and delta index 240 may be used in an information retrieval system 130. The store 210, index 224, delta store 230, and delta index 240 are data structures used for index creation and global analysis processes in accordance with certain implementations of the invention.

The store 210 is a repository for a tokenized version of each document in a corpus of documents to be used for the information retrieval system 130. For example, the documents may be Web pages obtained at a certain point in time or the documents may be files in a directory obtained at a certain point in time. The documents are parsed and tokenized before being put in the store 210. Parsing and tokenizing may be described as identifying words (tokens) from text in the documents that are to be indexed. Parsed documents are typically small, so they may be aggregated into bundles in the store 210 to improve Input/Output (I/O) performance. Each bundle corresponds to a single file and multiple documents. A document in the store 210 may be found using a locator. The locator may be described as a reference to a bundle followed by a reference within the bundle. Also, implementations of the invention provide an Application Programming Interface (API) that may be used to retrieve a document from the store 210, given the locator of the document.

Additionally, attribute-value pairs may be used to store data and metadata about a document. The data in the store 210 is used by the global analysis component 134 and by the indexing component 142. Attributes include, for example, a TEXT attribute for the tokenized text of a document, and attributes that are used as input for global analysis computations, such as an ANCHORTEXT attribute for the source anchor text of a document. An anchor may be described as a path or link to a document (e.g., a URL), while anchor text may be described as text associated with the path or link (e.g., a URL) that points to a document. In certain implementations, anchor text is text that labels or encloses hypertext text links in Web documents. Implementations of the invention provide an API to retrieve the value of a given attribute for a document from the store 210.

In certain implementations, the bundles are organized for efficient storage and retrieval for particular attributes. The store 210 may be implemented in various ways. That is, the implementation of the store 210 is independent from the pipelined architecture described for implementations of the invention, as long the functionality of retrieving attributes from documents is supported.

The indexing component 142 builds an index 220 from the store 210. The index 220 is used to determine which documents are chosen as "hits" when a query for a set of documents is received with certain criteria. Different information retrieval system 130 may use different index structures, such as an inverted text index over the documents content. Implementations of the invention are applicable to any type of index structure.

The information retrieval system 130 periodically updates the store 210 and index 220 with new documents. In certain implementations, the term "new" documents is used to refer to newly generated documents and to updated existing documents. This is especially useful in environments in which documents are constantly being created or updated. Additionally, certain implementations of the invention use a delta store 230 to accumulate changes to the store 210 and use a delta index 240 as an index over the delta store 230. This allows the index 220 to be rebuilt using an efficient batch process. The delta store 230 and delta index 240 mirror the structure and functionality of the store 210 and index 220, respectively. To make newly documents visible, queries requesting documents are run over both the index 220 and the delta index 240. The delta store 230 is periodically merged with the store 210, after which the index 220 is rebuilt, and the delta store 230 and the delta index 240 are reset. Resetting may be described as clearing the data structures of current content.

Figure 3:
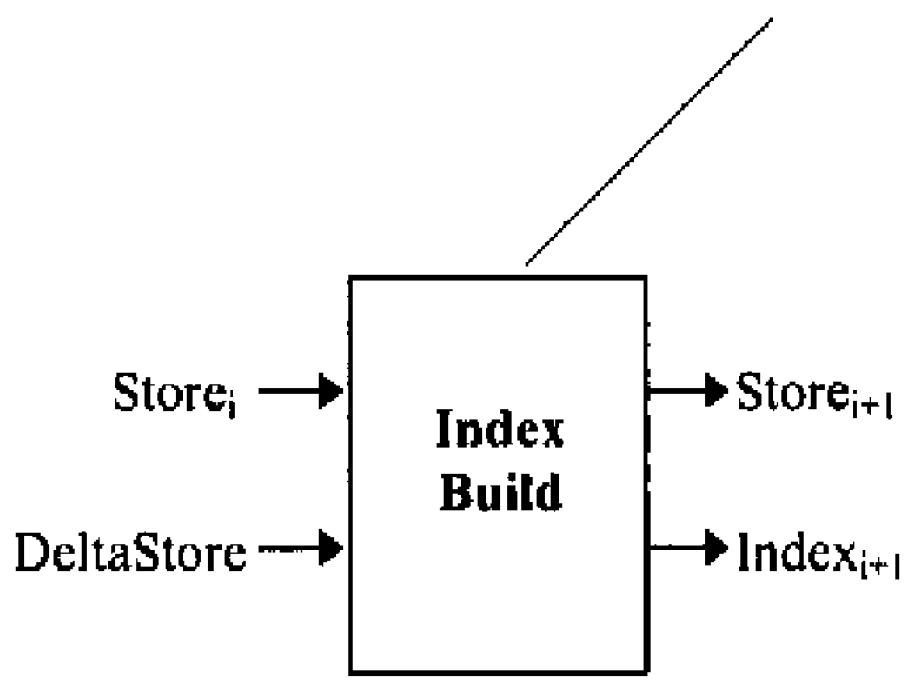
FIG. 3 illustrates an index build process implemented by an indexing component in accordance with certain implementations of the invention.

FIG. 3 illustrates an index build process 300 implemented by the indexing component 142 in accordance with certain implementations of the invention. The index build process 300 takes as input the current version of store 210 (labeled Store$_i$ in FIG. 3) and the current version of delta store 230 (labeled DeltaStore in FIG. 3). The index build process 300 then merges the current version of store 210 with the current version of delta store 230 and generates a new version of store 210 (labeled Store$_{i+1}$ in FIG. 3) and a new index 220 (labeled Index$_{i+1}$ in FIG. 3). The store 210 and index 220 are generated together in time in this manner. As Store$_{i+1}$ is generated from the current store 210 and the delta store 230, garbage collection takes place. Garbage collection may be described as a policy for ensuring that newer versions of documents replace older versions of documents in the store 210. For example, if document D in Store$_i$ has been replaced by a newer version of document D in the delta store 230 (called document D'), then only document D' appears in Store$_{i+1}$. After the index build process 300 has finished, Store$_{i+1}$ and Index$_{i+1}$ are copied, for example, to an appropriate data store 170, and the delta store 230 and delta index 240 are reset. A single scan of Store$_i$ and the DeltaStore is sufficient to perform garbage collection and generate Store$_{i+1}$ and Index$_{i+1}$.

Figure 4:
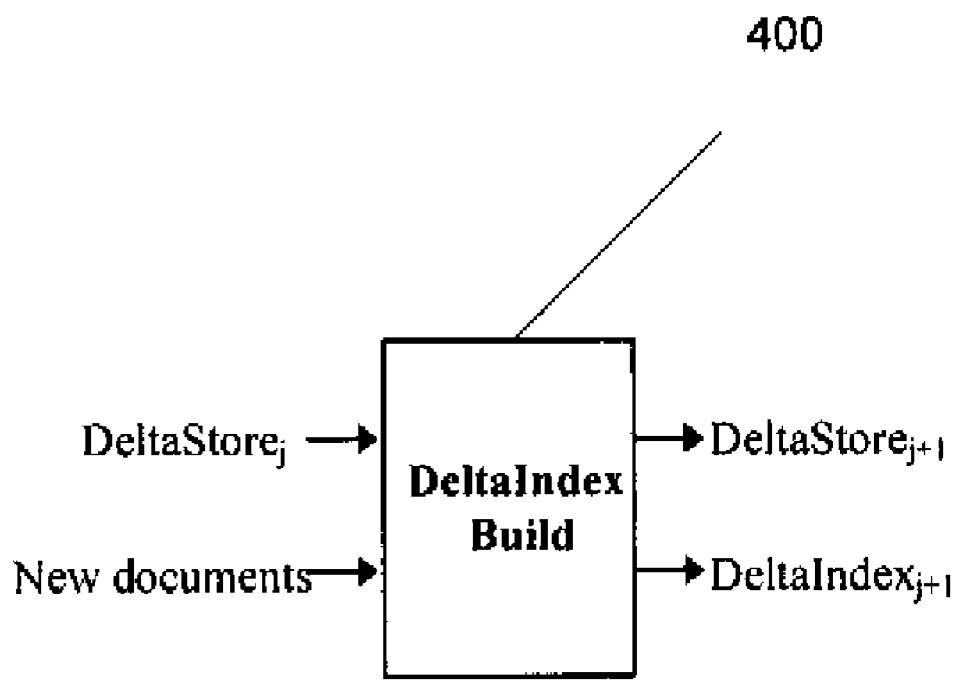
FIG. 4 illustrates a delta index build process implemented by a delta indexing component in accordance with certain implementations of the invention.

The delta store 230 and the delta index 240 are also generated together in time, but at a faster rate than the store 210 and the index 220. Thus, DeltaStore has no subscript in FIG. 3. FIG. 4 illustrates a delta index build process 400 implemented by the delta indexing component 144 in accordance with certain implementations of the invention. The delta index build process 400 takes as input a version of the delta store (labeled DeltaStore$_j$ in FIG. 4) and new documents. The delta index build process 400 merges DeltaStore$_j$ with the new documents to generate a new version of delta store (labeled DeltaStore$_{j+1}$ in FIG. 4) and a new version of delta index (labeled DeltaIndex$_{j+1}$ in FIG. 4). New documents may be stored in the same manner as documents in the delta store 230. Consequently, the process shown in FIG. 4 is similar to the one shown in FIG. 3, with new documents effectively acting as a delta to the delta store 230. A single scan of the new documents and DeltaStore$_j$ is sufficient to do garbage collection and generate DeltaStore$_{j+1}$ and DeltaIndex$_{j+1}$.

Figure 5:
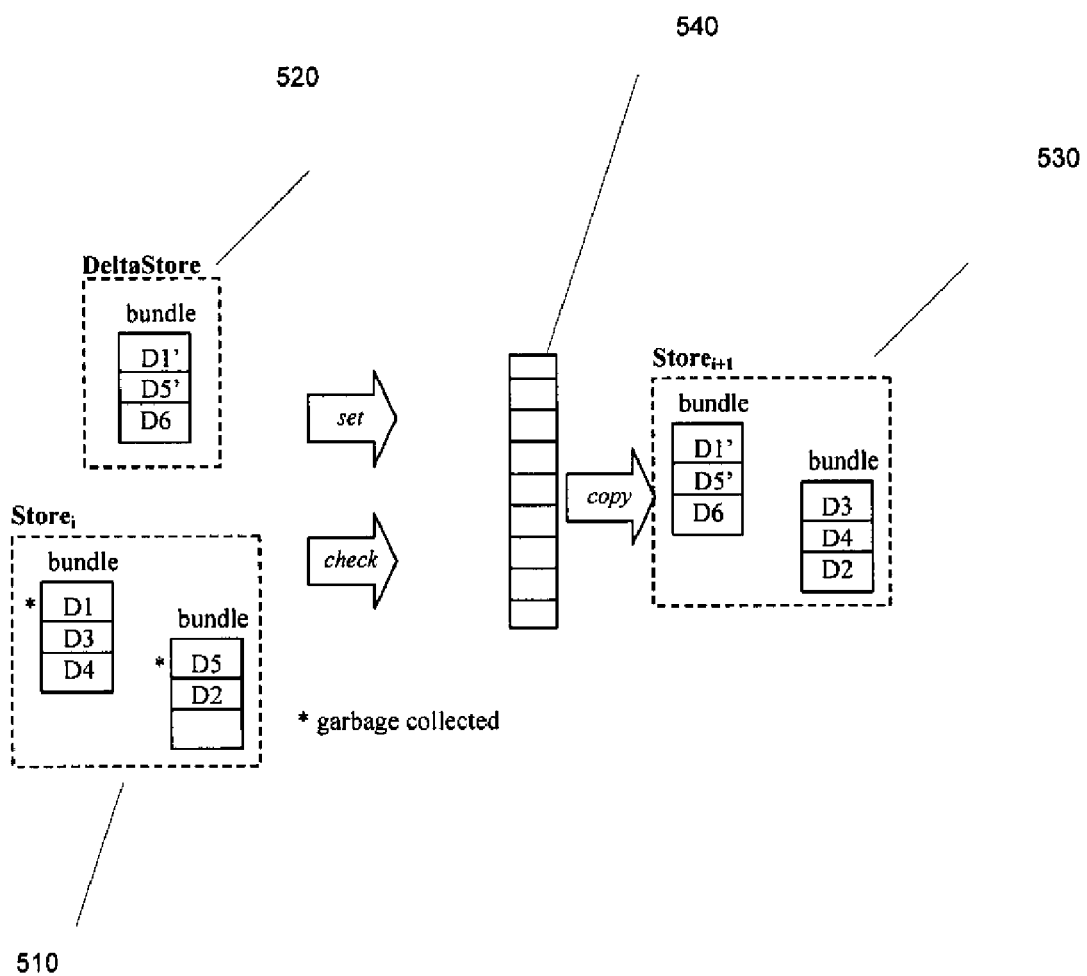
FIG. 5 illustrates a process for merging a store and a delta store in accordance with certain implementations of the invention.

FIG. 5 illustrates a process for merging a store 210 and delta store 230 in accordance with certain implementations of the invention. Store 210 is labeled Store$_i$ 510 and the delta store 230 is labeled DeltaStore 520 in FIG. 5. In certain implementations, for the processing of FIG. 5, data associated with a document (i.e., attribute value pairs) are grouped together into a single binary object. In the example of FIG. 5, documents D1 and D5 in Store$_i$ 510 have been replaced by more recent versions documents D1' and D5', respectively, in DeltaStore 520. Thus, documents D1 and D5 are garbage collected as a newer version of the data store (labeled Store$_{i+1}$ 530 in FIG. 5) is generated. In certain implementations, copying a bundle from the DeltaStore 520 to Store$_{i+1}$ 530 may be done with a file rename, depending on whether any meta-data in the bundle is to be updated.

The process illustrated in FIG. 5 may also be used to merge the delta store 230 and new documents. However, multiple versions of the same document may appear in the new documents. To ensure that the most recent version of a document is merged into the delta store 230, new documents are scanned in Last In First Out (LIFO) order.

In certain implementations, in FIG. 5, as a bundle in DeltaStore 520 is scanned, the bundle is copied to Store$_{i+1}$ 530, with a filter being set to indicate that the documents in this bundle have been "seen". After DeltaStore 520 is scanned, Store$_i$ 510 is scanned. As a bundle is scanned in Store$_i$ 510, the filter is probed to determine whether any documents in that bundle have been "seen" (i.e., copied from the DeltaStore 520 to Store$_{i+1}$ 530). Any "seen" documents may be skipped in Store$_i$ 510 (i.e., not copied to Store$_{i+1}$). In certain implementations, a hash table may be used in conjunction with the filter. Structure 540 represents a filter that optionally has an associated hash table.

To avoid multiple scans of the current store 210 during index build, Store$_{i+1}$ and Index$_{i+1}$ are generated in parallel. This is accomplished by feeding the bundles of Store$_{i+1}$ into the sort for Index$_{i+1}$ before they are copied to storage (e.g., disk). The final phase of building Index$_{i+1}$, which consists of merging sorted runs, takes place after Store$_{i+1}$ is copied to storage (e.g., disk). The delta index 240 is built in a similar way, that is, using a single scan of the delta store 230 and new documents. Certain implementations of the invention provide a store merge API that marks two stores as merged and does not do any garbage collection until the index build process initiates a scan of the merged store.

Figure 6A:
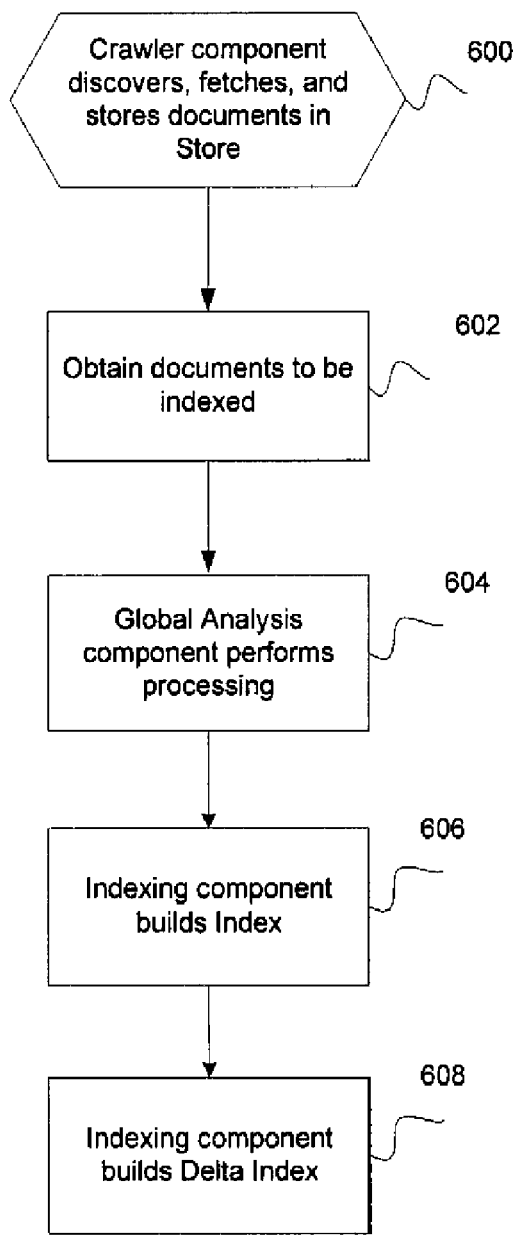
FIG. 6A illustrates logic for an index build process in accordance with certain implementations of the invention.
Figure 6B:
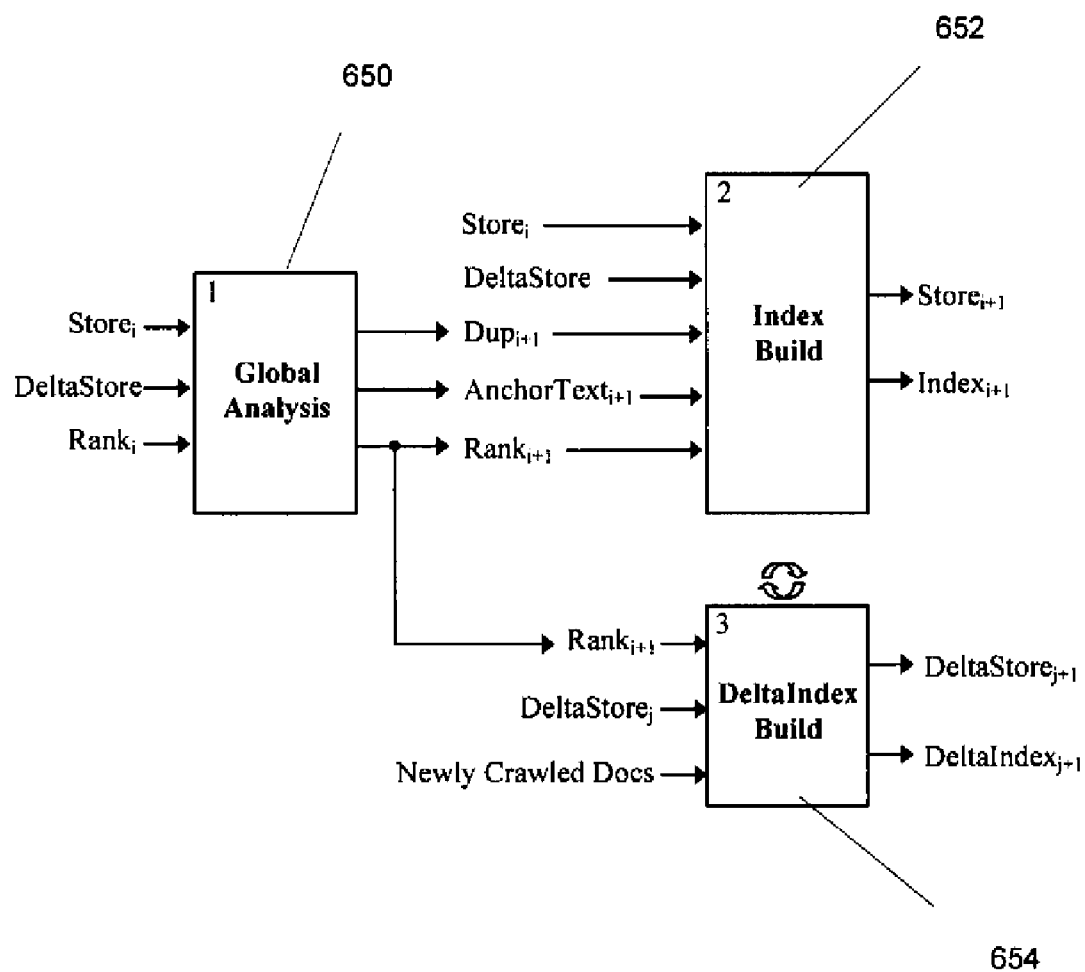
FIG. 6B illustrates, in a block diagram, a high-level flow of an index build process in accordance with certain implementations of the invention.

FIG. 6A illustrates logic for an index build process in accordance with certain implementations of the invention. FIG. 6B illustrates, in a block diagram, a high-level flow of an index build process in accordance with certain implementations of the invention. In FIG. 6A, control begins at block 600 and documents that are to be indexed by the search engine 130 are obtained. In certain implementations, the documents are published or pushed (e.g., as may be the case with newspaper articles) to the indexing component 142. In certain implementations, the crawler component 132 discovers, fetches, and stores the documents. At a subsequent time, in block 602, the crawler component 132, discovers, fetches, and stores new documents in delta store 230.

In block 604, the global analysis component 134 performs global analysis. For example, the global analysis component 134 may perform multiple global analysis computations, such as duplicate detection, anchor text analysis, and static ranking. In certain implementations, the global analysis component 134 performs the duplicate detection, anchor text analysis, and static ranking directly, and, in certain implementations, the global analysis component 134 invokes the duplicate detection 138, anchor text 140, and static rank 136 components to perform this processing.

FIG. 6C illustrates auxiliary data structures that may be used by global analysis computations in accordance with certain implementations of the invention. The auxiliary data structures include a duplicates table 670, an anchor text table 672, and a rank table 674. The duplicates table 670 identifies documents that are duplicates of each other and identifies a "master" among duplicates. The anchor text table 672 collects anchor text pointing to each document in the store 210. The rank table associates a static rank with each document in the store 210. Thus, the global analysis component 134 is capable of performing any global analysis computations used by the information retrieval system 130, using data structures used by each of these global analysis computations. The global analysis computations and data structures presented herein are just examples of possible scenarios. The global analysis computations and data structures presented herein are useful to illustrate how the global analysis computations are integrated in the index build process and how intermediate results may be shared among global analysis computations in a pipelined manner.

The duplicates table 670, anchor text table 672, and rank table 674 are derived from a global analysis of the documents in the store 210. Although the duplicates table 670, anchor text table 672, and rank table 674 are illustrated as single entities, one or more of the duplicates table 670, anchor text table 672, and rank table 674 may be implemented as one or more tables in storage (e.g., disk). A subscript used with each data structure denotes which version of the store 210 that the data structure reflects. For example, $Rank_{i+1}$ corresponds to the ranking of documents in $Store_{i+1}$.

After the global analysis component performs processing, the indexing component builds an index 220 (block 606) and builds a delta index 240 (block) 608.

With reference to FIG. 6B, a global analysis process 650 implemented by the global analysis component 134 takes $Store_i$ and $DeltaStore_i$ as input and outputs $Rank_{i+1}$, $AnchorText_{i+1}$, and $Dup_{i+1}$. The index build process 652 implemented by the indexing component 142 then takes this information, along with $Store_i$ and $DeltaStore_i$, and generates $Store_{i+1}$ and $Index_{i+1}$. During this process, garbage collection is performed on $Store_i$. After $Store_{i+1}$ and $Index_{i+1}$ have been generated, the delta index build process 654 implemented by the delta indexing component 144 may be resumed. The delta index build process cycles at its own rate, generating a new delta store 230 and delta index 240 each cycle.

The performance of the index build process is largely bound by the time to do a scan of the store 210 and to perform the global analysis computations, which might be quite expensive. Two scans of the store 210 are required in FIG. 6B. One scan is to perform global analysis computations and another scan is to build the index. Certain implementations of the invention reduce the time for the index build process by modifying the flow for index build. In particular, certain implementations of the invention use $Rank_i$, $AnchorText_i$, and $Dup_i$ to build $Index_{i+1}$ rather than $Rank_{i+1}$, $AnchorText_{i+1}$, and $Dup_{i+1}$. In other words, a slightly older ("stale") global analysis ($GA_i$) is used to build $Index_{i+1}$ rather than $GA_{i+1}$.

Figure 7A:
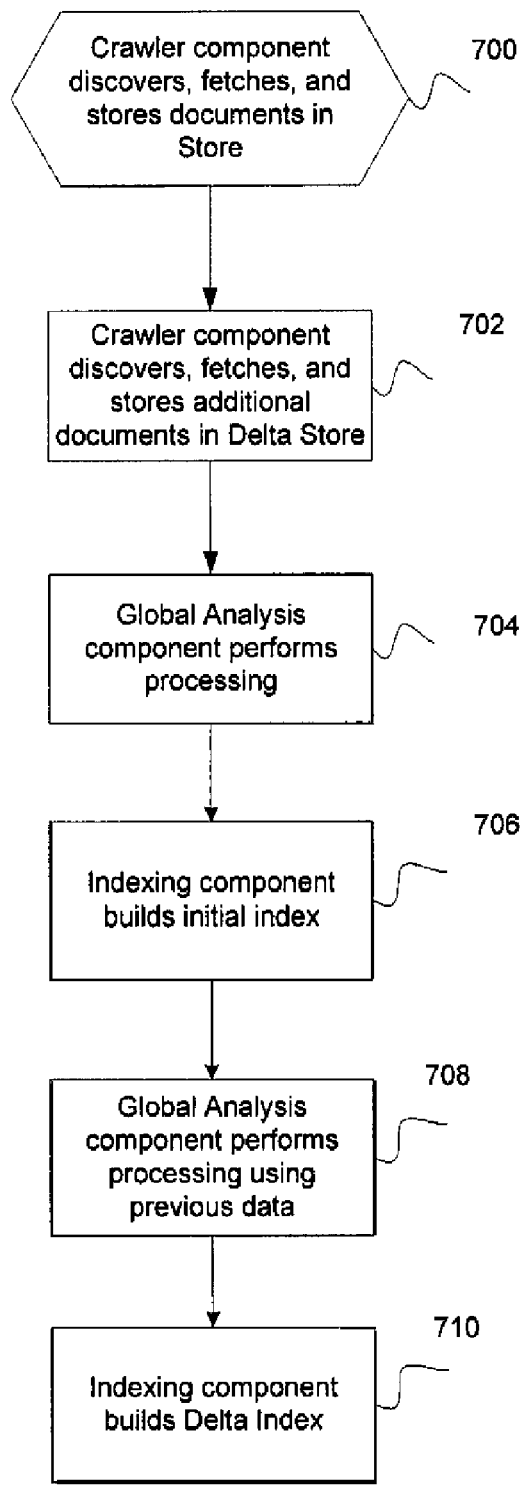
FIG. 7A illustrates logic for an index build process in accordance with certain alternative implementations of the invention.
Figure 7B:
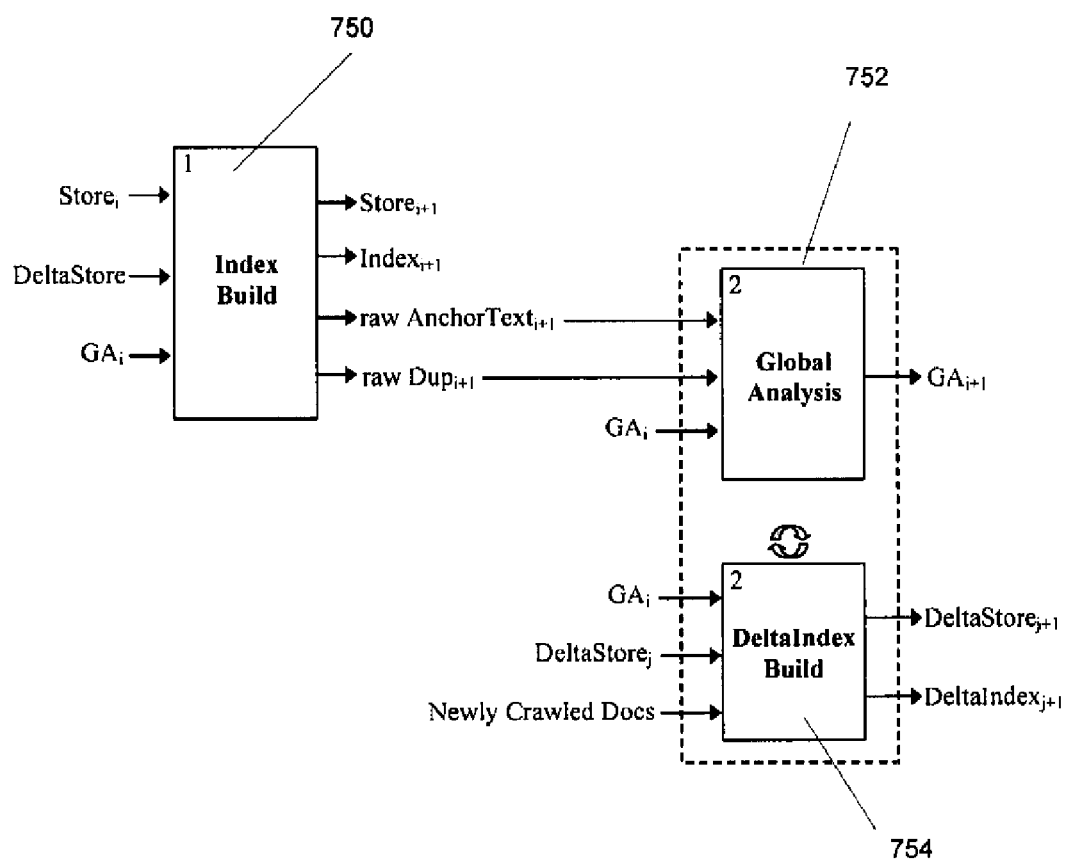
FIG. 7B illustrates, in a block diagram, a high-level flow of an index build process in accordance with certain alternative implementations of the invention.

FIG. 7A illustrates logic for an index build process in accordance with certain alternative implementations of the invention. FIG. 7B illustrates, in a block diagram, a high-level flow of an index build process in accordance with certain alternative implementations of the invention. In FIG. 7A, control begins at block 700 with the crawler component 132 discovering, fetching, and storing documents in store 210. At a subsequent time, in block 702, the crawler component 132, discovers, fetches, and stores new documents in delta store 230.

In block 704, the global analysis component 134 performs global analysis. In block 706, the indexing component 142 builds an initial index using slightly older input data. In block 708, the global analysis component 134 performs global analysis, while the delta index component 144 builds a new delta store and a new delta index.

With reference to FIG. 7B, the index build process 750 implemented by the indexing component 142 uses $GA_i$ to build $Index_{i+1}$ rather than using $GA_{i+1}$ to build $Index_{i+1}$. In certain implementations, there may be some loss in index precision, but the loss is likely to be small since information, such as document rank, is unlikely to change drastically from $GA_i$ to $GA_{i+1}$.

In FIG. 7B, the index build process 750 produces "raw" versions of $AnchorText_{i+1}$, and $Dup_{i+1}$. This information is extracted from $Store_i$ and DeltaStore as they are scanned. The term "raw" indicates that more processing is needed to produce the final version. For example, because of duplicates, the raw $AnchorText_{i+1}$ may contain multiple copies of the same anchor text. The global analysis process 752 implemented by the global analysis component 134 refines the raw information and produces $GA_{i+1}$.

In FIG. 7B, the anchor text for $Store_{i+1}$ is aggregated into $AnchorText_{i+1}$. The anchor text remains there, and the store is not later updated to add each document's anchor text to its bundle. This is avoided as it may require updating many bundles in the store, which is expensive in terms of resources that are used.

In addition to cutting the number of store 210 scans in half, using slightly older global analysis results (GA) also allows the delta index build process 754 to be done in parallel with the global analysis process 752. This allows the cycle time of the index build process to be reduced.

Figure 8:
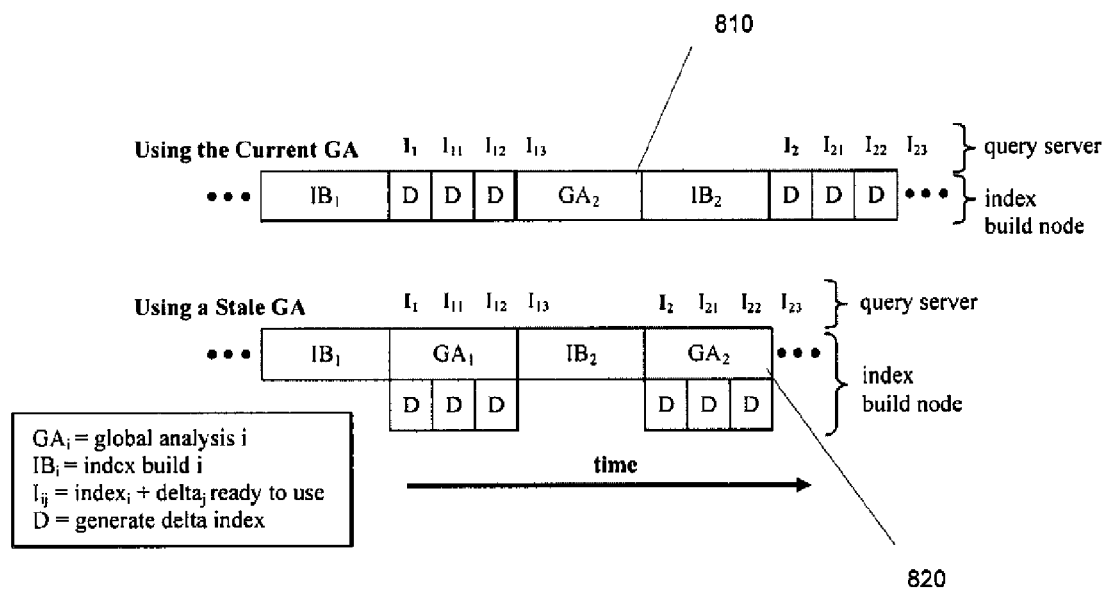
FIG. 8 illustrates processing using current global analysis results versus using slightly older global analysis results in accordance with certain implementations of the invention.

FIG. 8 illustrates processing using current global analysis results 800 versus using slightly older global analysis results 820 in accordance with certain implementations of the invention. As illustrated in FIG. 8, if the current global analysis results are used, then the delta index build process is stopped during the global analysis process, otherwise the global analysis would not reflect the current contents of the delta store. In contrast, by using a slightly older ("stale") global analysis results, the delta index build process may be performed in parallel with the global analysis process.

In order to generate the first index ($Index_0$), implementations of the invention run the index build process in FIG. 7B twice, with the appropriate inputs and outputs set to null each time. More specifically, building the first index begins with the first store ($Store_0$). In the first iteration, $Store_0$ is input to the indexing component 142, which outputs raw $Dup_0$ and raw $AnchorText_0$. These are input to the global analysis component 134, which outputs $Dup_0$, $AnchorText_0$, and $Rank_0$. Then, on the second iteration, $Store_0$, $Rank_0$, $Dup_0$, and $AnchorText_0$ are input to the indexing component 142, which generates $Index_0$.

Figure 9A:
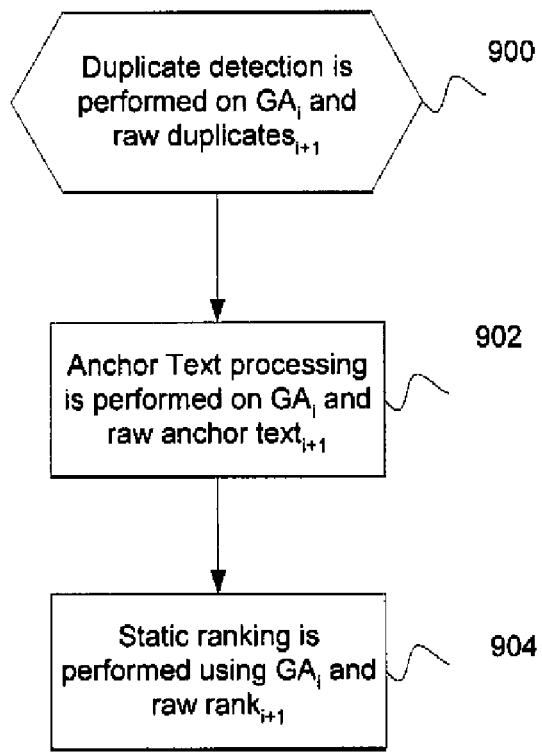
FIG. 9A illustrates logic for a global analysis process in accordance with certain implementations of the invention.
Figure 9B:
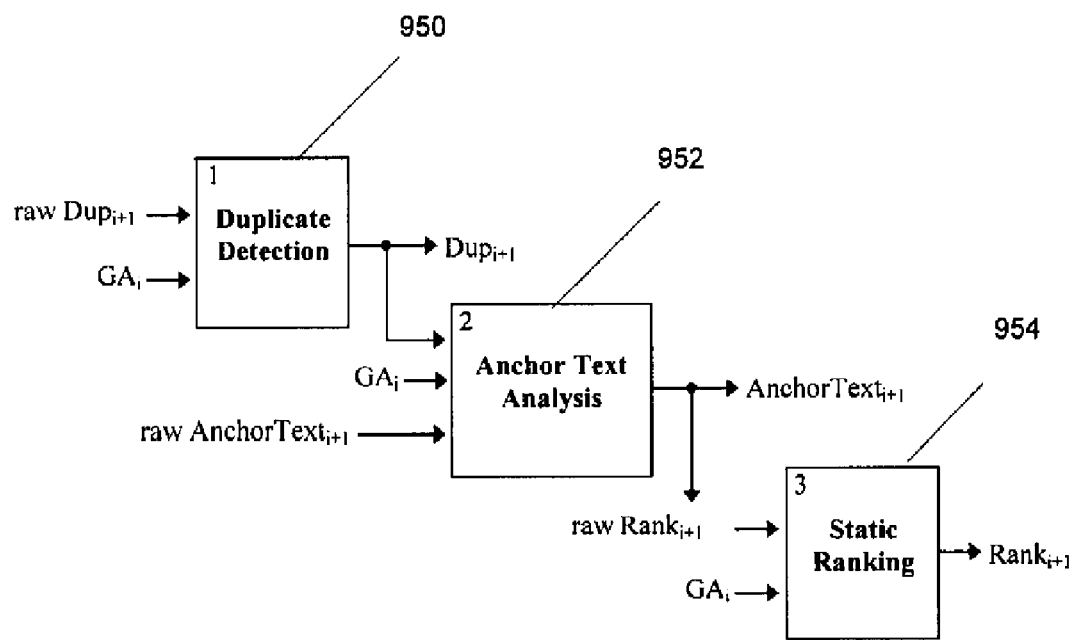
FIG. 9B illustrates, in a block diagram, a flow of a global analysis process in accordance with certain implementations of the invention.

FIG. 9A illustrates logic for a global analysis process in accordance with certain implementations of the invention. FIG. 9B illustrates, in a block diagram, a flow of the global analysis process in accordance with certain implementations of the invention. In FIG. 9A, control begins at block 900 with duplicate detection 950 being performed using as input raw $Dup_{i+1}$ and $GA_i$ and outputting $Dup_{i+1}$. In block 902, anchor text analysis 952 is performed using as input $AnchorText_{i+1}$ and $GA_i$ and outputs $AnchorText_{i+1}$. In block 904, static ranking 954 is performed with input $Rank_{i+1}$ and $GA_i$ and outputting $Rank_{i+1}$.

With reference to FIG. 9B, the global analysis process inputs raw versions of $AnchorText_{i+1}$, and $Dup_{i+1}$ and outputs $Rank_{i+1}$ along with $AnchorText_{i+1}$, and $Dup_{i+1}$. The duplicate detection produces $Dup_{i+1}$ by sorting the raw version of $Dup_{i+1}$ on, for example, a destination URL. $Dup_{i+1}$ identifies a single "master" URL for each set of duplicate documents. This information is used by the anchor text analysis 952, which replaces destination and source URLs by their master URLs, so that duplicate anchor text may be kept out of the index. A projection on $AnchorText_{i+1}$ is then used to produce raw $Rank_{i+1}$ (e.g., in the form of a link graph ($Link_{i+1}$)) of destination and source URLs. The static rank component 136 computes $Rank_{i+1}$ from $Link_{i+1}$. Thus, common intermediate results are shared between global analysis computations.

Thus, when creating an index, global analysis need not yet be finished. Instead, the index build process uses the results of a recent global analysis process that has already finished. In certain implementations, for documents that have changed since the global analysis was computed, the change may be ignored and the available results may be used, while for new documents for which no results are available, a default value (e.g. a minimum or average value) may be used. That is, although document content may have changed, the already computed information, e.g. rank, may be used without loss of precision.

Lagging global analysis may be used in different scenarios. For example, if global analysis is slower than an index build, but fast enough to run between two index builds, index build for iteration N may use the global analysis results from iteration (N−1). Hence global analysis for iteration N may run concurrently. Moreover, if global analysis takes longer than the time between two index builds, global analysis may run continuously in the background. Whenever an iteration of global analysis finishes, another iteration starts over with the most recent data. In certain implementations, global analysis may be skipped for a few iterations of the index build. The indexing component 142 then uses the most recent complete global analysis results.

A high frequency of index builds are achieved to fulfill strict freshness requirements, at the temporary cost of some precision in the global analysis. Also, the architecture allows new documents to be indexed in smaller indices (delta indices) that are queried together with the main indices. In certain implementations, global analysis is not performed for the delta indices in the first version of those indices. Thus, when the freshness requirements are strict compared to the time required by the global analysis computations, new documents may be indexed and retrieved before their global information is computed.

In certain implementations, the techniques of the invention may be applied to per-document analysis (e.g., summarization, keyword extraction, etc.) that does not require a global analysis of an entire corpus. Using lagging per-document analysis information is especially useful in scenarios where the change rate of documents is high, and the per-document analysis is expensive.

Additional Implementation Details

The described techniques for a pipelined architecture for global analysis and index building may be implemented as a method, apparatus or article of manufacture using standard programming and/or engineering techniques to produce software, firmware, hardware, or any combination thereof The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which various implementations are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Thus, the "article of manufacture" may comprise the medium in which the code is embodied. Additionally, the "article of manufacture" may comprise a combination of hardware and software components in which the code is embodied, processed, and executed. Of course, those skilled in the art will recognize that many modifications may be made to this configuration without departing from the scope of the present invention, and that the article of manufacture may comprise any information bearing medium known in the art.

The logic of FIGS. 6A, 7A, and 9A describes specific operations occurring in a particular order. In alternative implementations, certain of the logic operations may be performed in a different order, modified or removed. Moreover, operations may be added to the above described logic and still conform to the described implementations. Further, operations described herein may occur sequentially or certain operations may be processed in parallel, or operations described as performed by a single process may be performed by distributed processes.

The illustrated logic of FIGS. 6A, 7A, and 9A may be implemented in software, hardware, programmable and non-programmable gate array logic or in some combination of hardware, software, or gate array logic.

Figure 10:
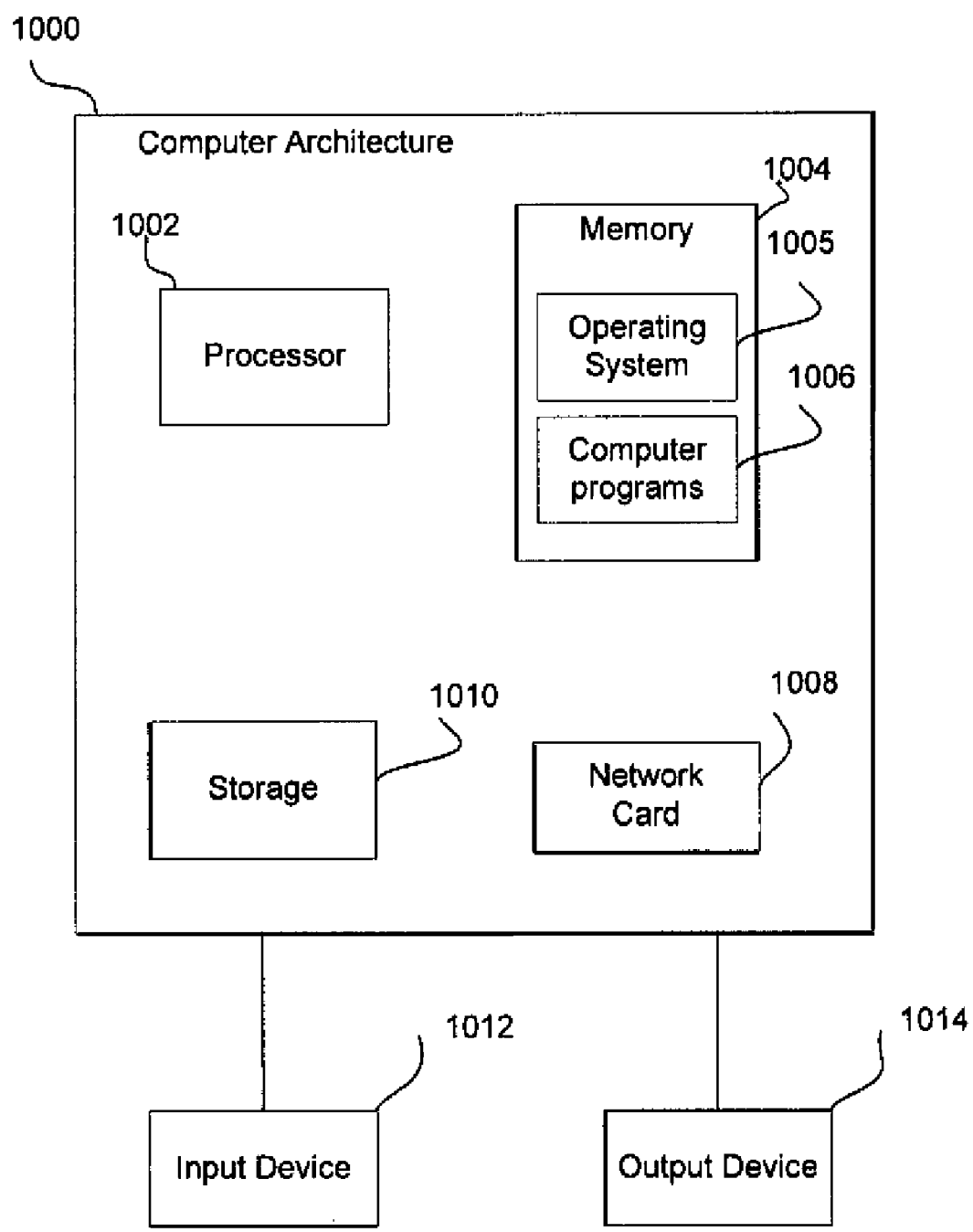
FIG. 10 illustrates an architecture of a computer system that may be used in accordance with certain implementations of the invention.

FIG. 10 illustrates an architecture of a computer system that may be used in accordance with certain implementations of the invention. For example, client computer 100, server computer 120, and/or operator console 180 may implement computer architecture 1000. The computer architecture 1000 may implement a processor 1002 (e.g., a microprocessor), a memory 1004 (e.g., a volatile memory device), and storage 1010 (e.g., a non-volatile storage area, such as magnetic disk drives, optical disk drives, a tape drive, etc.). An operating system 1005 may execute in memory 1004. The storage 1010 may comprise an internal storage device or an attached or network accessible storage. Computer programs 1006 in storage 1010 may be loaded into the memory 1004 and executed by the processor 1002 in a manner known in the art. The architecture further includes a network card 1008 to enable communication with a network. An input device 1012 is used to provide user input to the processor 1002, and may include a keyboard, mouse, pen-stylus, microphone, touch sensitive display screen, or any other activation or input mechanism known in the art. An output device 1014 is capable of rendering information from the processor 1002, or other component, such as a display monitor, printer, storage, etc. The computer architecture 1000 of the computer systems may include fewer components than illustrated, additional components not illustrated herein, or some combination of the components illustrated and additional components.

The computer architecture 1000 may comprise any computing device known in the art, such as a mainframe, server, personal computer, workstation, laptop, handheld computer, telephony device, network appliance, virtualization device, storage controller, etc. Any processor 1002 and operating system 1005 known in the art may be used.

The foregoing description of implementations of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many implementations of the invention may be made without departing from the spirit and scope of the invention, the invention resides in the claims hereinafter appended.

What is claimed is:

1. A method for building an index, comprising:
   storing, using a computer with a processor, a current version of a store having a tokenized version of each document in a corpus of documents, a delta store accumulating changes to the current version of the store, and previously generated global analysis computations, wherein the previously generated global analysis computations include an anchor text table, a rank table, and a duplicates table;
   building a new version of the index and outputting a raw anchor text table and a raw duplicates table a by accessing the current version of the store, the delta store, and the previously generated global analysis, computations; and
   generating new global analysis computations by accessing the raw anchor text table, the raw duplicates table, and the previously generated global analysis computations, wherein the new global analysis computations include a new anchor text table, a new rank table, and a new duplicates table.

2. The method of claim 1, further comprising:
   building a new version of a delta store using the previously generated global analysis computations, a current version of a delta store, and newly crawled documents.

3. The method of claim 1, further comprising:
   building a new version of a delta index using the previously generated global analysis computations, a current version of a delta store, and newly crawled documents.

4. The method of claim 3, wherein the creation of the new delta index allows new documents to be indexed and retrieved before global analysis computations for the new documents are performed.

5. The method of claim 3, further comprising:
   receiving a query requesting retrieval of one or more documents; and
   accessing the new version of the index and the new version of the delta index to retrieve one or more documents.

6. The method of claim 3, wherein generating the new global analysis computations is performed in parallel with creation of the new version of the delta index.

7. The method of claim 1, wherein the new global analysis computations are generated using results of recent processing of documents existing at a certain point in time.

8. An article of manufacture comprising a tangible computer readable storage medium storing a program for building an index, wherein the program, when executed by a processor of a computer, causes operations to be performed, the operations comprising:
   storing a current version of a store having a tokenized version of each document in a corpus of documents, a delta store accumulating changes to the current version of the store, and previously generated global analysis computations, wherein the previously generated global analysis computations include an anchor text table, a rank table, and a duplicates table;
   building a new version of the index and outputting a raw anchor text table and a raw duplicates table by accessing the current version of the store store$_i$, the delta store, and the previously generated global analysis computations; and
   generating new global analysis computations by accessing the raw anchor text table, the raw duplicates table, and the previously generated global analysis computations, wherein the new global analysis computations include a new anchor text table, a new rank table, and a new duplicates table.

9. The article of manufacture of claim 8, wherein the operations for index creation further comprise:
   building a new version of a delta store using the previously generated global analysis computations, a current version of a delta store, and newly crawled documents.

10. The article of manufacture of claim 8, wherein the operations further comprise:
    building a new version of a delta index using the previously generated global analysis computations, a current version of a delta store, and newly crawled documents.

11. The article of manufacture of claim 10, wherein the creation of the new delta index allows new documents to be indexed and retrieved before global analysis computations for the new documents are performed.

12. The article of manufacture of claim 10, wherein the operations further comprise:
    receiving a query requesting retrieval of one or more documents; and
    accessing the new version of the index and the new version of the delta index to retrieve one or more documents.

13. The article of manufacture of claim 10, wherein generating the new global analysis computations is performed in parallel with creation of the new version of the delta index.

14. The article of manufacture of claim 8, wherein the new global analysis computations are generated using results of recent processing of documents existing at a certain point in time.

15. A computer system, comprising:
    a processor; and
    hardware logic for:
        storing a current version of a store having a tokenized version of each document in a corpus of documents, a delta store accumulating changes to the current version of the store, and previously generated global analysis computations, wherein the previously generated global analysis computations include an anchor text table, a rank table, and a duplicates table;
        building a new version of the index and outputting a raw anchor text table and a raw duplicates table by accessing the current version of the store, the delta store, and the previously generated global analysis computations; and
    generating new global analysis computations by accessing the raw anchor text table, the raw duplicates table, and the previously generated global analysis computations, wherein the new global analysis computations include a new anchor text table, a new rank table, and a new duplicates table.

16. The computer system of claim 15, wherein the logic for index creation further comprises:
    building a new version of a delta store using the previously generated global analysis computations, a current version of a delta store, and newly crawled documents.

17. The computer system of claim 15, wherein the logic further comprises:

building a new version of a delta index using the previously generated global analysis computations, a current version of a delta store, and newly crawled documents.

18. The computer system of claim 17, wherein the creation of the new delta index allows new documents to be indexed and retrieved before global analysis computations for the new documents are performed.

19. The computer system of claim 17, wherein the logic further comprises:

receiving a query requesting retrieval of one or more documents; and accessing the new version of the index and the new version of the delta index to retrieve one or more documents.

20. The computer system of claim 17, wherein generating the new global analysis computations is performed in parallel with creation of the new version of the delta index.

21. The computer system of claim 15, wherein the new global analysis computations are generated using results of recent processing of documents existing at a certain point in time.

* * * * *